United States Patent [19]

Watanabe et al.

[11] Patent Number: 4,860,034

[45] Date of Patent: Aug. 22, 1989

[54] INK JET RECORDING APPARATUS WITH AMBIENT TEMPERATURE DETECTING MEANS FOR PROVIDING A SIGNAL TO DRIVE CONTROL MEANS RESPONSIVE TO A RECORDING-DENSITY DATA SIGNAL

[75] Inventors: Yoshitaka Watanabe, Tokyo; Nobuaki Sakurada; Makoto Aoki, both of Yokohama; Eiichi Sato, Tokyo, all of Japan

[73] Assignee: Canon Kabushiki Kaisha, Tokyo, Japan

[21] Appl. No.: 177,881

[22] Filed: Mar. 30, 1988

Related U.S. Application Data

[63] Continuation of Ser. No. 849,398, Apr. 8, 1986, abandoned.

[30] Foreign Application Priority Data

| | | | |
|---|---|---|---|
| Apr. 15, 1985 | [JP] | Japan | 60-079597 |
| Apr. 15, 1985 | [JP] | Japan | 60-079598 |
| May 15, 1985 | [JP] | Japan | 60-103173 |
| May 15, 1985 | [JP] | Japan | 60-103174 |

[51] Int. Cl.[4] .............................................. G01D 15/16

[52] U.S. Cl. .................................. 346/140 R; 346/65; 358/298

[58] Field of Search .................... 346/140, 76 PH, 65, 346/75; 358/298

[56] References Cited

U.S. PATENT DOCUMENTS

| | | | |
|---|---|---|---|
| 3,828,357 | 8/1974 | Koeblitz . | |
| 4,275,402 | 6/1981 | Kern | 346/140 |
| 4,296,421 | 10/1981 | Hara et al. | 346/140 R |
| 4,396,923 | 8/1983 | Noda | 346/76 PH |
| 4,494,126 | 1/1985 | Todoh | 346/76 PH |
| 4,516,135 | 5/1985 | Todoh | 346/76 PH |
| 4,544,931 | 10/1985 | Watanabe et al. | 346/140 PD |
| 4,591,876 | 5/1986 | Nozaki et al. | 346/76 PH |
| 4,737,860 | 4/1988 | Ono | 346/76 PH X |

FOREIGN PATENT DOCUMENTS

| | | |
|---|---|---|
| 3038398A1 | 4/1981 | Fed. Rep. of Germany . |
| 57-57679 | 4/1982 | Japan . |
| 59-196265 | 11/1984 | Japan . |

*Primary Examiner*—Joseph W. Hartary
*Attorney, Agent, or Firm*—Fitzpatrick, Cella, Harper & Scinto

[57] ABSTRACT

The driving frequency of a head is changed in conformity with temperature, and density data is converted into an optimum head driving voltage in conformity with temperature, whereby the discharge driving frequency and driving voltage of the recording head become optimum under any temperature condition, and thus recording of high quality is ensured the since irregularities caused by the temperature variation of the recording head are eliminated. The driving voltage is set by a drive control circuit that includes a plurality of limiters, one of which is chosen in accordance with ambient temperature.

3 Claims, 9 Drawing Sheets

INK JET RECORDING APPARATUS WITH AMBIENT TEMPERATURE DETECTING MEANS FOR PROVIDING A SIGNAL TO DRIVE CONTROL MEANS RESPONSIVE TO A RECORDING-DENSITY DATA SIGNAL

This application is a continuation of application Ser. No. 849,398 filed Apr. 8, 1986, now abandoned.

BACKGROUND OF THE INVENTION

1. Field of the Invention

This invention relates to an ink jet recording apparatus for discharging ink to a recording medium to thereby effect recording of characters, images and the like, and in particular to an ink jet recording apparatus having a temperature compensating function.

2. Related Background Art

An ink jet recording apparatus of the type in which the driving voltage of an ink jet head is varied to vary the amount of ink discharge, whereby the recording dot diameter is varied to express half-tone, has already been proposed.

However, the apparatus of this type has the temperature characteristic that the value of a property of the recording liquid, i.e., the viscosity or surface tension of ink, is greatly varied by temperature and the discharge of the head itself is varied by temperature. Accordingly, the relation between the optical density on recording paper after recording and the voltage applied to the head is varied by temperature as generally shown in FIG. 2 of the accompanying drawings. That is, as temperature becomes higher, the optical density becomes higher even for the same voltage applied to the head.

Therefore, if printing is effected at 10° C. by the use, for example, of the same density-voltage data used at 25° C. as has heretofore been done, there will occur an inconvenience that printing density becomes low and ink is not discharged in the low voltage area, and if printing is effected at 40° C. by the use of the same density-voltage data used at 25° C., there will occur various inconveniences, including the variation in the density in the image representation range, that the amount of ink discharge becomes great and print becomes too dark and the recording paper becomes unable to absorb ink and the ink oozes.

On the other hand, as the conventional temperature compensating method, there is a method of using a heater or the like to keep the value of the property of ink constant as disclosed in Japanese Patent Applications Laid-Open Nos. 188363/1982 and 188364/1982, and a method of varying the voltage applied to the had in conformity with temperature as disclosed in Japanese Patent Applications Laid-Open Nos. 27210/1980 and 14759/1983. However, the former method suffers from disadvantages such as bulkiness of the apparatus, increased capacity of the power source, which in turn leads to increased manufacturing cost, and unsatisfactory printing resulting from the production of soluble gas of ink caused by rapid heating.

The latter method is effective only with respect to binary images, and if the amount of ink discharge is to be varied by this method to thereby express half-tone, the circuit construction will become very complicated for non-linear variations in various characteristics, and this has led to higher cost and difficulty in putting this method into practical use. This latter method has further suffered from a problem that during low temperatures, increased viscosity of ink causes the return of meniscus after discharge to be delayed, which results in a reduced response frequency leading to the necessity of compensating for the frequency characteristic of the head at each temperature.

SUMMARY OF THE INVENTION

It is an object of the present invention to overcome the above-noted disadvantages and to drive ink jet recording means by optimum discharge amount data obtained by inputting to discharge amount data output means the detected temperature data of temperature detecting means for detecting the ambient temperature and recording density data and make the driving voltage of the ink jet recording means optimum under any temperature condition, thereby ensuring recording of high quality to be accomplished.

It is another object of the present invention to drive the ink jet recording means under a maximum driving frequency defined by driving frequency defining means in conformity with the detected temperature data of the temperature detecting means.

It is still another object of the present invention to ensure discharge energy compensating means to effect discharge of a proper amount of ink irrespective of temperature conditions and thereby enable half-tone recording of high quality by an ink jet recording apparatus to be achieved.

It is yet still another object of the present invention to supply a driving signal within a range in which stable discharge can be obtained.

DESCRIPTION OF THE PREFERRED EMBODIMENTS

A first embodiment of the present invention will hereinafter be described with reference to the drawings.

Figure 1:
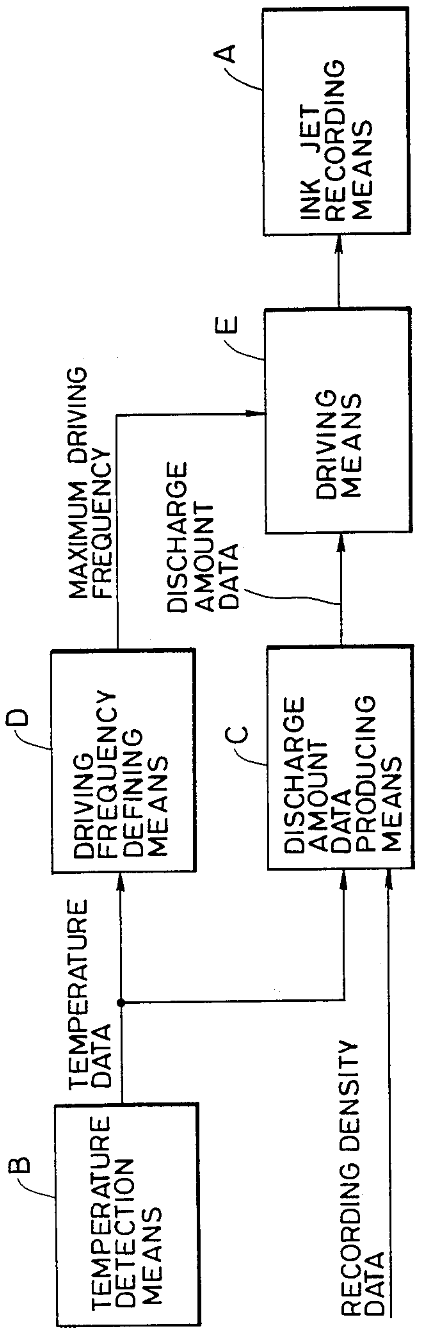
FIG. 1 is a block diagram showing the basic construction of a first embodiment of the present invention.

Referring to FIG. 1 which shows the basic construction of the first embodiment, letter A designates ink jet recording means for discharging ink droplets onto a recording medium to thereby effect recording, letter B denotes temperature detection means for detecting the ambient temperature, and letter C designates discharge amount data producing means for receiving the detected temperature data of the temperature detection means B and recording density data as inputs and putting out the corresponding optimum discharge amount data. Letter D denotes driving frequency defining means for defining the maximum driving frequency of the ink jet recording means A in conformity with the detected temperature data of the temperature detection means B. Letter E designates driving means for driving the ink jet recording means A under the maximum frequency defined by the driving frequency defining means D on the basis of the optimum discharge amount data obtained from the discharge amount data producing means C.

The driving frequency defining means D need not always be provided, but the ink jet recording means A may be driven by only the optimum discharge amount data obtained from the discharge amount data producing means C.

Figure 3:
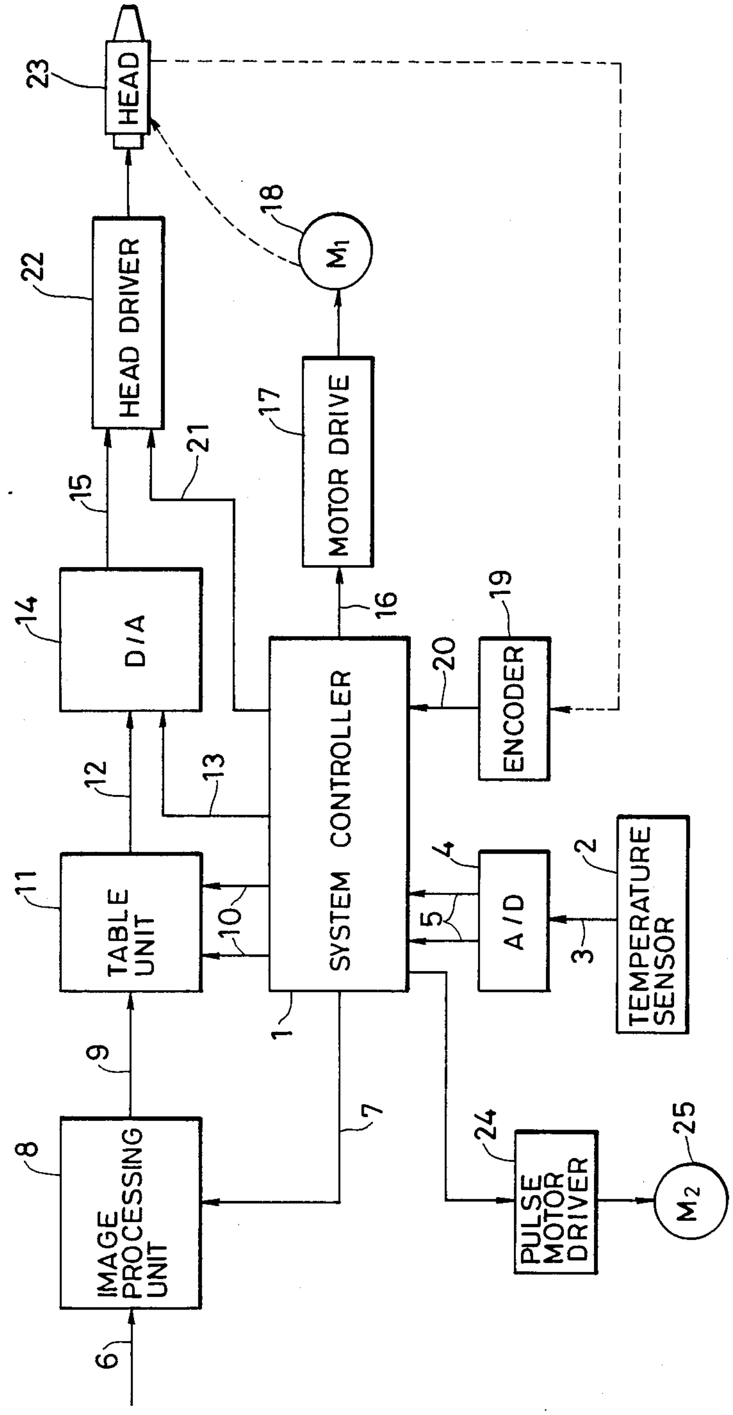
FIG. 3 is a block diagram showing construction of the apparatus according to the first embodiment.

Referring now to FIG. 3 which specifically shows the circuit shown in FIG. 1, reference numeral designates a sequence controller which effects the control operation of the entire apparatus on the basis of a control procedure as shown in FIG. 6 which is pre-stored in an internal memory. Reference numeral 2 denotes a temperature sensor as ambient temperature detection means comprising a thermistor or the like. A temperature detection signal 3 put out from the temperature sensor 2 is converted into a 2-bit temperature signal 5 by an A/D (analog/digital) converting unit 4 and delivered to the sequence controller 1.

Reference numeral 8 designates an image processing unit which applies predetermined image processing to an image input signal 6 and converts this signal into density data 9 and further stores this density data 9 in an internal memory and thereafter, puts out outputs successively from this internal memory in response to the data output instruction signal 7 from the sequence controller 1.

Reference numeral 11 denotes a data converting table unit as discharge amount data output means. The table unit 11 receives as inputs the density data 9 from the image processing unit 8 and the temperature data 10 from the sequence controller 1 and converts them into 6-bit voltage value data 12. Reference numeral 14 designates a D/A (digital/analog) converting unit which latches the voltage value data 12 in synchronism with the latch pulse 13 from the sequence controller 1 and D/A-converts it and puts out converted analog data 15.

Reference numeral 17 denotes a motor driver for driving a head scanning motor 18 which reciprocally moves a recording head to be described through a carriage, not shown. The motor driver 17 is controlled by the control signal 16 from the sequence controller 1. Reference numeral 19 designates an encoder unit which detects the position of the recording head and puts out a position signal 20. The encoder unit 19 comprises a conventional optical sensor, a slit, etc.

Reference numeral 22 denotes a head driver as drive means for driving the recording head 23. The head driver 22 drives the recording head 23 in response to a discharge instruction pulse 21 put out from the sequence controller 1 by the analog voltage data 15 from the D/A converting unit 14 and the position signal 20 from the encoder unit 19. The recording head 23 discharges ink droplets toward recording paper which is a recording medium.

As will be described later, the sequence controller 1 is provided with a construction for defining the minimum time interval, i.e., the maximum frequency, of the discharge instruction pulse 21 in response to the temperature signal 5.

Further, reference numeral 24 denotes a pulse motor driver which drives a paper feeding pulse motor 25 for feeding the recording paper. The pulse motor driver is controlled by the control signal from the sequence controller 1.

The temperature sensor 2 and the head 23 are disposed near the scanning pass thereof or an ink tank (not shown) for supplying ink to the head 23.

Figure 4:
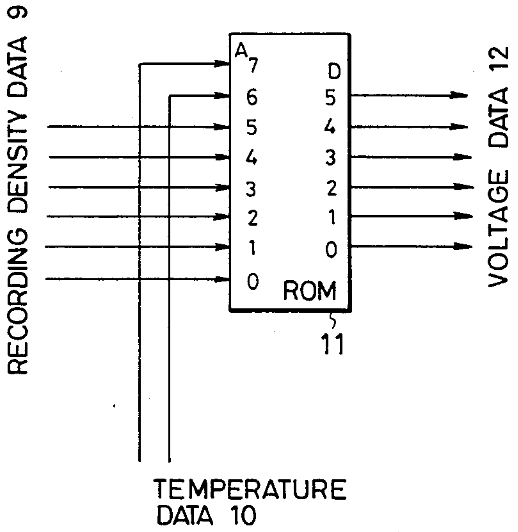
FIG. 4 is a circuit diagram showing an example of the construction of the table unit of FIG. 3.

FIG. 4 shows an example of the construction of the table unit 11 of FIG. 3. As shown, the table unit 11 comprises, for example, an ROM (read only memory), and the temperature data (temperature signal) 10 from the sequence controller 1 is input to the most significant two bits of the input port of the ROM and the density data (density signal) 9 from the image processing unit 8 is input to the least significant six bits of the input port, whereby the search address (reference address) is determined and 6-bit voltage value data ($D_0$–$D_5$) 12 is put out from the output port thereof.

TABLE 1

| Temperature data | | Density data | | | | | | Voltage value data | | | | | |
|---|---|---|---|---|---|---|---|---|---|---|---|---|---|
| $A_7$ | $A_6$ | $A_5$ | $A_4$ | $A_3$ | $A_2$ | $A_1$ | $A_0$ | $D_5$ | $D_4$ | $D_3$ | $D_2$ | $D_1$ | $D_0$ |
| 0 | 0 | 0 | 0 | 0 | 0 | 0 | 0 | 0 | 0 | 0 | 0 | 0 | 0 |
| 0 | 0 | 0 | 0 | 1 | 0 | 0 | 0 | 0 | 0 | 0 | 1 | 0 | 0 |
| 0 | 0 | 1 | 1 | 1 | 1 | 1 | 1 | 1 | 0 | 0 | 0 | 0 | 0 |
| 0 | 1 | 0 | 0 | 0 | 0 | 0 | 0 | 0 | 0 | 0 | 0 | 0 | 1 |
| 0 | 1 | 0 | 0 | 1 | 0 | 0 | 0 | 0 | 0 | 0 | 1 | 0 | 1 |
| 0 | 1 | 1 | 1 | 1 | 1 | 1 | 1 | 1 | 0 | 0 | 0 | 0 | 1 |
| 1 | 0 | 0 | 0 | 0 | 0 | 0 | 0 | 0 | 0 | 0 | 0 | 1 | 0 |
| 1 | 0 | 0 | 0 | 1 | 0 | 0 | 0 | 0 | 0 | 0 | 1 | 1 | 0 |
| 1 | 0 | 1 | 1 | 1 | 1 | 1 | 1 | 1 | 0 | 0 | 0 | 1 | 0 |
| 1 | 1 | 0 | 0 | 0 | 0 | 0 | 0 | 0 | 0 | 0 | 0 | 1 | 1 |
| 1 | 1 | 0 | 0 | 1 | 0 | 0 | 0 | 0 | 0 | 0 | 1 | 1 | 1 |
| 1 | 1 | 1 | 1 | 1 | 1 | 1 | 1 | 1 | 0 | 0 | 0 | 1 | 1 |

Table 1 above shows an example of the content of the table unit 11. As shown in the table, the content is set up in advance so that by temperature data ($A_6$, $A_7$) varying, different voltage value data ($D_0$–$D_5$) for the same density data ($A_0$–$A_5$) are put out.

Figure 5:
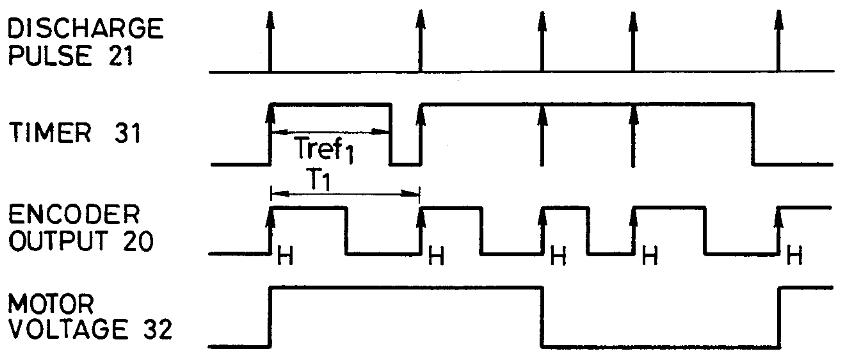
FIG. 5 is a timing chart of signals showing an example of the operation of the apparatus of FIG. 3.

FIG. 5 is a time chart regarding the defining of the driving frequency of the recording head 23. In FIG. 5, a timer 31 is the internal timer of the sequence controller 1, and motor voltage 32 is a driving voltage for the head scanning motor 18.

Figure 6A:
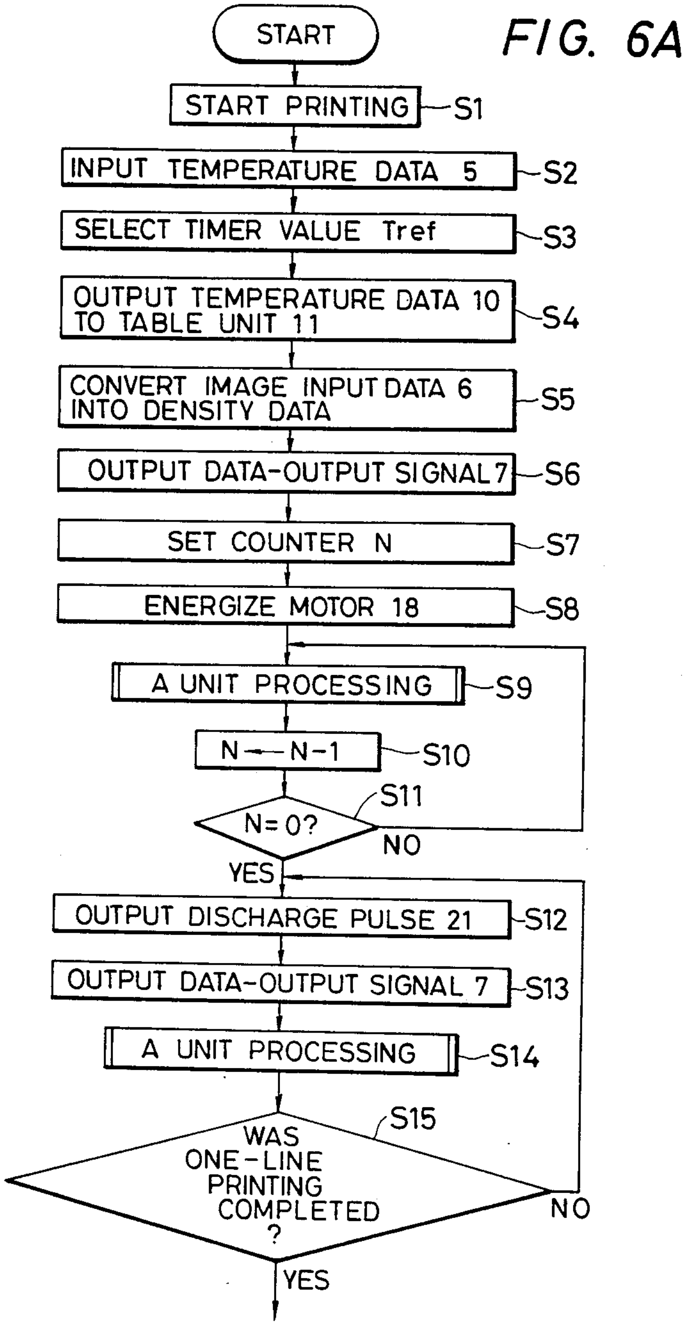
FIGS. 6A and 6B are flow charts showing an example of the control operation by the sequence controller of FIG. 3.
Figure 6B:
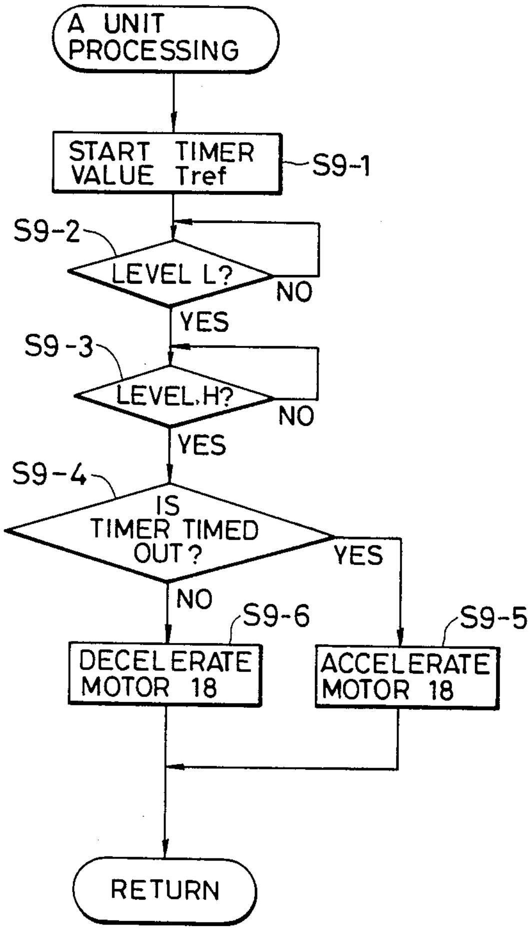

The operation of the apparatus in the above-described construction will now be described with reference to the flow charts of FIGS. 6A and 6B.

When the printing process is started (step S1), the output signal 3 of the temperature sensor 2 is converted into a 2-bit temperature signal 5 by the A/D converting unit 4 and is supplied to the sequence controller 1 (step S2). Subsequently, in response to the 2-bit temperature signal 5, for example, $Tref_1$ is selected from among constants Tref, . . . , $Tref_4$ in which is prepared in advance a time constant Tref for determining the driving frequency 1/Tref of the recording head 23, in the sequence controller 1 (step S3). Further, temperature data 10 corresponding to the 2-bit temperature signal 5 from the A/D converting unit 4 is put out from the sequence controller 1 to the most significant two bits $A_7$ and $A_6$ of the input port of the table unit 11 and this temperature data is latched throughout the recording of one picture plane (one page) (step S4). This latching is effected for the purpose of eliminating the instability in the vicinity of the temperature changing point and because it is not necessary to vary the voltage supplied to the recording head 23 since the variation in the temperature of ink discharged is relatively gentle even if the ambient temperature changes sharply.

When the image input signal 6 is then input to the image processing unit 8, this input signal 6 is subjected to the predetermined image processing necessary for image representation in the image processing unit 8, whereafter it is converted into density data 9 and the converted density data 9 is stored in the internal memory (step S5). When the preparation for the execution of printing is completed, a data-output instruction signal 7 is put out from the sequence controller 1 to the image processing unit 8 and density data 9 corresponding to one picture element (a first picture element) is put out from the internal memory of the image processing unit 8 to the table unit 11 (step S6). Subsequently, a count value N is set in the internal counter in the sequence controller 1 (step S7), and the motor driver 17 is operated by a control signal 16. Thereby the motor 18 is energized and the scanning of the recording head 23 is started (step S8).

At the same time, the timer (31 in FIG. 6) in the sequence controller 1 is started (step S9-1). The then set value of the timer is the constant $Tref_1$ selected in conformity with the temperature signal 5 at the above-described step S3. Subsequently, the rising of the output signal 20 of the encoder unit 19 is detected (steps S9-2 and S9-3). If the rising of this encoder output signal 20 is input after the timer is timed out (step S9-4), it shows that the movement speed of the recording head 23 is low and therefore, the sequence controller 1 accelerates the head scanning motor 18 (step S9-5), and if the rising of the above-mentioned encoder output signal 20 takes place during the operation of the timer, it shows that the movement speed of the recording head 23 is high and therefore, the sequence controller 1 decelerates the head scanning motor 18 (step S9-6). At the same time, the value of the timer is reset and the above-mentioned count value N is subtracted by 1 (step S10) and, if the value N is not zero (step S11), the program returns to the timer starting process of step S9-1 and repeats the processes of the above-described steps S9-1 to S9-6. By these operations being successively repeated, the movement speed of the recording head 23 becomes constant and the recording head 23 moves the output pitch of the encoder unit 19 at the time $Tref_1$. Accordingly, the output pitch of the encoder 19 is made coincident with the output pitch of the image, whereby the driving frequency of the recording head 23 is kept constant and the constant Tref is changed in conformity with the temperature signal 5 and thus, the driving frequency can be varied.

The count value N of the encoder output signal 20 is preset so that it becomes zero at a time whereat the recording head 23 which has assumed a predetermined speed in this manner arrives at its initial discharge position and therefore, when the count value N becomes N=0 at step S11, the program shifts to the next step S12 and the recording head starts discharging. By this time, 6-bit density data 9 corresponding to the first picture element has already been supplied from the image processing unit 8 to the input ports $A_5$–$A_0$ of the table unit 11 by the processing at step S6 and temperature data 10 has already been supplied to the input ports $A_7$ and $A_6$ of the table unit 11 by the processing at step S4. In the table unit 11, as described above, the 6-bit voltage value data 12 extracted with the data 9 and 10 input to the input ports $A_7$–$A_0$ as the address is put out from the output ports $D_5$–$D_0$ thereof, and this data 12 is converted into an analog voltage value 15 by the D/A converting unit 14 and input to the head driver 22. When at this time, the encoder output 20 is input to the sequence controller 1, a discharge instruction pulse 21 is put out from the sequence controller 1 to the head driver 22 (step S12), and the recording head 23 is driven at the analog voltage value 15 in synchronism with the discharge instruction pulse 21 and a predetermined amount of ink is discharged.

Subsequently, the data output instruction signal 7 is again supplied from the controller 1 to the image processing unit 8 and the density data corresponding to the next picture element is supplied from the image processing unit 8 to the table unit 11 (step S13). Subsequently, the operations of the above-described steps S9-1 to S9-6 are effected (step S14), and the processing operations of the above-described steps S12–S14 are repeated until one-line printing is effected (step S15). Thereafter, the above-described operation is repeated correspondingly to a picture plane, whereby an image is recorded on the recording paper.

Although the first embodiment has been described with respect to a case where the number of the recording heads is one, the present invention is not restricted thereto, but may of course be applicable also to a recording apparatus having a plurality of recording heads or line heads for color recording. In this case, the address of the table unit (ROM) 11 can be changed so as to correspond to the temperature data of each recording head. It is also possible to obtain finer temperature compensation by further increasing the number of the bits of the temperature data 10. The method of controlling the movement speed of the recording head is not restricted to that shown in this embodiment, but of course, other conventional methods may also be used.

A second embodiment of the present invention will now be described.

In an on-demand type ink jet recording apparatus, the relation between the driving voltage and the amount of ink discharge is expressed as follows:

$$Z = k \cdot V + b \quad (1),$$

where Z is the amount of ink discharge, V is the driving voltage, and k and b are constants having temperature dependency. When temperature has changed from a reference temperature $T_0$° K. to $T_x$° K., the relations of equation (1) at the respective temperatures are:

$$Z_{T0} = k_{T0} \cdot V_{T0} + b_{T0} \quad (2)$$

$$Z_{Tx} = k_{Tx} \cdot V_{Tx} + b_{Tx} \quad (3)$$

At this time, it is necessary that $Z_{T0}$ and $Z_{Tx}$ be equal to each other independently of temperature. So, from equations (2) and (3), $V_{Tx}$ may be corrected by the use of the following equation:

$$V_{Tx}=(k_{T0}/k_{Tx})\cdot V_{T0}+(b_{T0}/k_{Tx})-(b_{Tk}/k_{Tx}) \quad (4)$$

Figure 2:
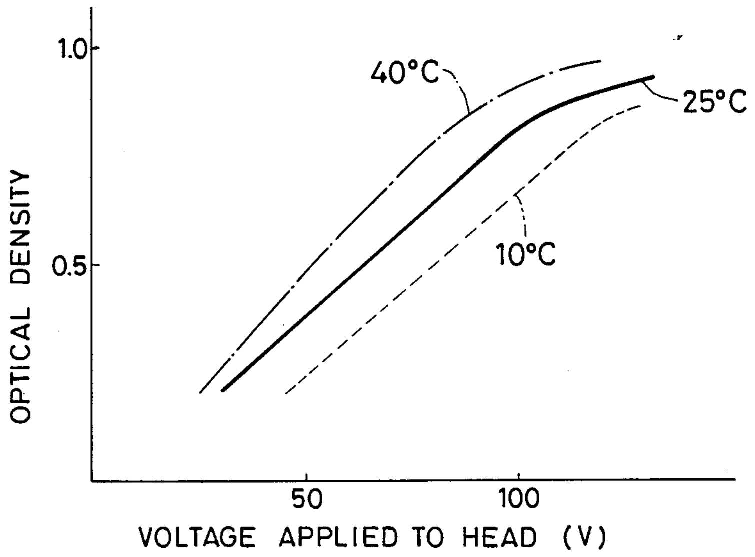
FIG. 2 is a graph showing the relation of the voltage applied to a head and the optical density to temperature.

On the other hand, what is conceivable as the factor of having the temperature as shown in FIG. 2 is the variation in the viscosity of ink by temperature, and it is known that the viscosity of ink is proportional to $e^{a/T^\circ K.}$ with a as constant and with e as the base of natural logarithms. Accordingly, the relation between the values k and b in equation (4) can be expressed as follows:

$$k_{T0}/k_{Tx}=e^{(L1/Tx)+M1} \quad (5)$$

$$b_{T0}/k_{Tx}=e^{(L2/Tx)+M2} \quad (6),$$

where L1, L2, M1 and M2 are constants independent of temperature. Also, it is empirically known that in equation (4), $b_{Tx}/k_{Tx}$ is a constant and therefore, these constants can be empirically found in advance.

Accordingly, if there is the data of the relation between the amounts of control $V_{T0}$ and $Z_{T0}$ at the reference temperature $T_0$° K., optimum temperature compensation conforming to temperature becomes possible.

Figure 7:
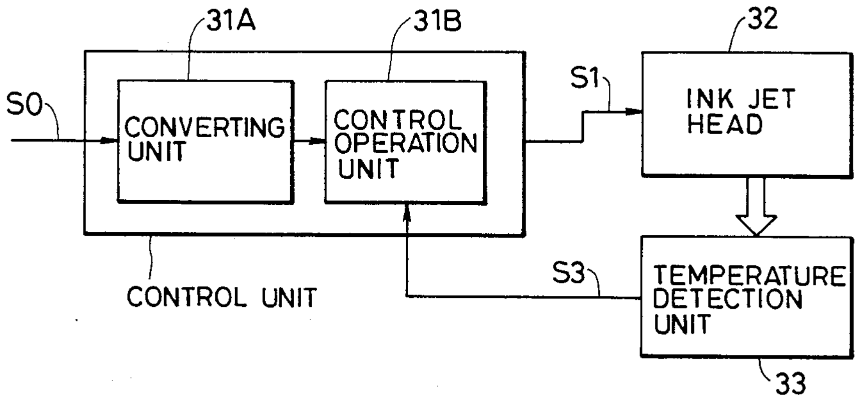
FIG. 7 is a block diagram showing the basic construction according to a second embodiment of the present invention.

FIG. 7 is a circuit block diagram of the ink jet apparatus. In FIG. 7, reference numeral 31 designates a control unit having a converting unit 31A and a control operation unit 1B. Reference numeral 32 denotes an ink jet head. The amount of ink discharge from this head 32 is controlled by a driving voltage signal S1 put out from the control unit 1. Reference numeral 33 designates a temperature detection unit having a temperature sensor for detecting the environment temperature. The temperature detection unit 33 converts the detected temperature into an electrical signal and supplies it as a temperature signal S3 to the control operation unit 31B. The temperature sensor may be provided at a desired location whereat it can appropriately detect the environment temperature, such as the vicinity of the nozzle portion of the head 32, the ink supply tube or the ink tank.

Recording data S0 corresponding to the amount of ink discharge necessary for the printing by desired half-tone expression is converted into an output voltage signal necessary for the discharge at a reference temperature, e.g. 25° C., by the converting unit 31A of the control unit 1 and is input to the control operation unit 31B. On the other hand, the temperature detection unit 33 detects the environment temperature such as the temperature of the head 32 and supplies it as the temperature signal S3 to the control operation unit 31B. The control operation unit 31B effects the operation of the aforementioned equations (4)–(6) from these two input signals, puts out an output voltage signal S1 corresponding to the detected ambient temperature and supplies it to the head 32. Accordingly, the head 32 operates in an optimally temperature-compensated form and thus, the amount of ink discharge necessary for the intended printing can be obtained even if temperature varies.

Figure 8:
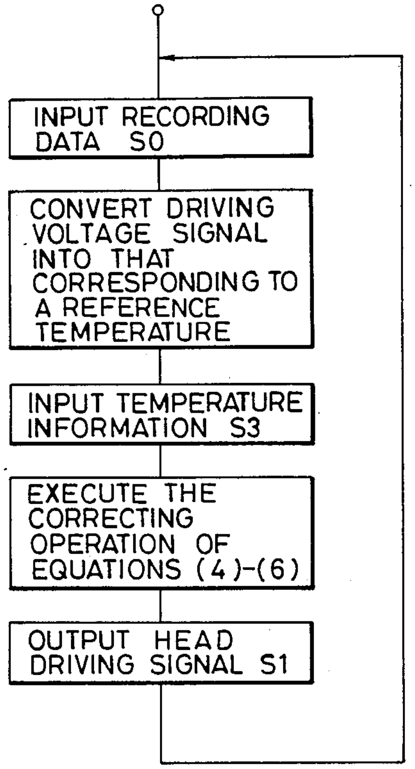
FIG. 8 is a flow chart showing the processing procedure of the circuit of FIG. 7.

The control unit 31 in FIG. 7 may be, for example, a microprocessor and the operation thereof can be realized by the processing procedure as shown in FIG. 8.

Figure 9:
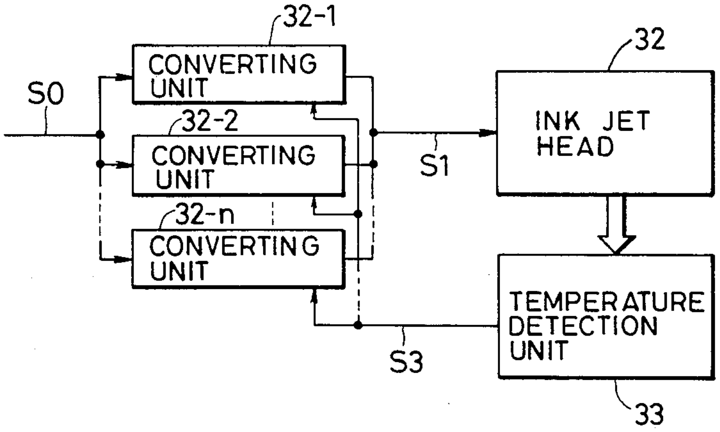
FIG. 9 is a block diagram showing a modification of the embodiment of FIG. 7.

FIG. 9 shows a modification of the FIG. 7 embodiment in which are provided a plurality of converting units 32-1 to 32-n for receiving recording data S0 and temperature signal S3. The converting units 32-1 to 32-n in this modification have a voltage converting table corresponding to the reference temperature and in addition, a memory or the like storing therein a converted content corresponding the result of the aforementioned operation at a certain temperature. When the environment temperature has been detected by a temperature detection unit 33, the temperature signal S3 corresponding to this detection is used as a change-over signal for the converting units 32-1 to 32-n. This change-over can be realized, for example, by providing a comparator in the converting units 32-1 to 32-n, whereby a converting unit suited for the detected temperature is selected. The selected converting unit converts the signal S0 corresponding to the amount of ink discharge into an output voltage signal S0 stored in itself and drives a head 32.

That is, the present modification can also obtain an effect similar to that obtained by the second embodiment. Also, in the present modification, as compared with the second embodiment, the capacity of the memory becomes large, but high-speed processing becomes possible.

A third embodiment of the present invention will now be described.

Figure 10:
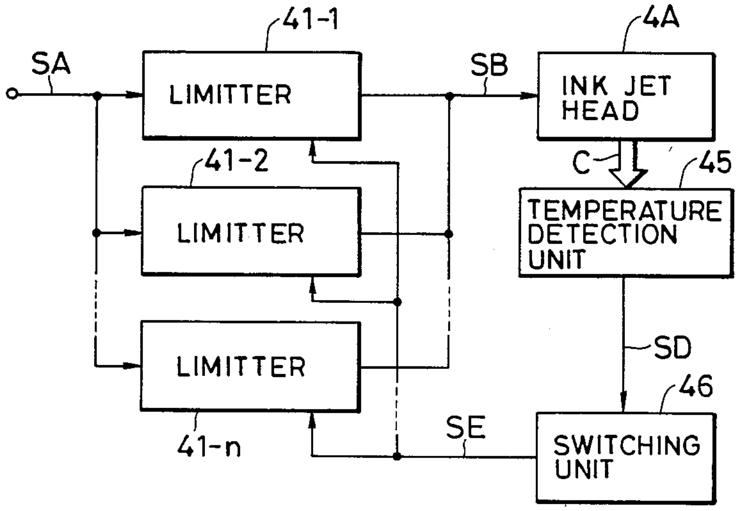
FIG. 10 is a block diagram showing the second construction according to a third embodiment of the present invention.

FIG. 10 shows a block circuit diagram of the ink jet recording apparatus of the third embodiment which is designed such that the range of driving output amount is changed over in n stages in conformity with temperature. In FIG. 10, SA designates a density signal corresponding to the amount of ink during the desired recording by half-tone representation. This signal is supplied to limiters 41-1 to 41-n. On the other hand, the environment temperature is converted into an electrical signal SD by a temperature detection unit 45 including a temperature sensor or the like, and this signal SD is directed to a switching unit 46. The temperature sensor may be provided at a desired location whereat it can appropriately detect the ambient temperature, such as the vicinity of the nozzle portion of a head 44, the ink supply tube or the ink tank.

The switching unit 46 puts out a switching signal SE in response to the temperature information thereof and selects a limiter suited for the then temperature condition. Thereupon, the density signal SA input to that limiter is applied as a driving signal SB to the ink jet head 44 with a characteristic suited for the then temperature of the ink jet head 44.

Figure 11:
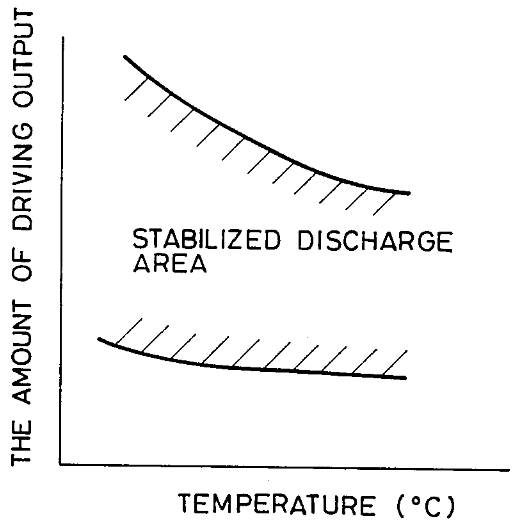
FIG. 11 is a graph showing the range of driving energy obtaining stabilized discharge relative to temperature.
Figure 12:
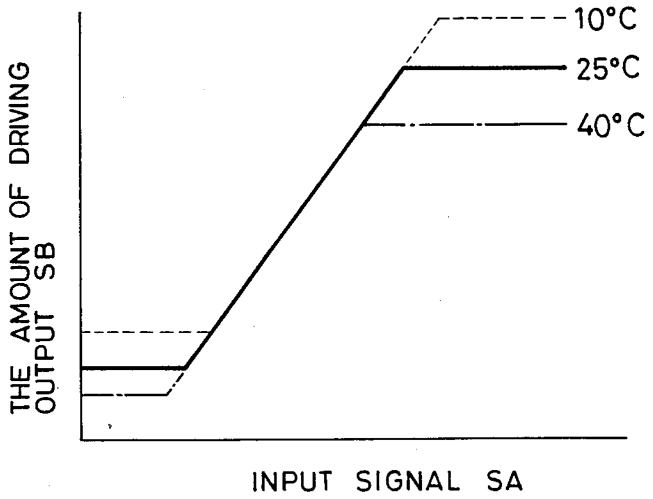
FIG. 12 is a graph for illustrating the operation of limiters used in the apparatus shown in FIG. 10.

The limiters 41-1 to 41-n limit the amount of driving output within a range which does not exceed the stability limit at a temperature corresponding to the stabilized discharge temperature characteristic of FIG. 11 and whenever a signal SA exceeding it is input, the limiters put out a signal SB in the vicinity of the limit value thereof. Thus, even when there is an excessively great or excessively small driving input depending on the then temperature, the head 44 will operate stably. These limiters 41-1 to 41-n may be in one of various forms such as switches and operation means. The input and output in these limiters 41-1 to 41-n may be, for example, in the relation shown in FIG. 12.

As previously described, the recording means having the ink jet head varies its operative condition, i.e., the stabilized discharge area, by its temperature, and can accomplish always stabilized discharge by detecting the temperature and limiting the amount of drive to the stabilized discharge area in conformity with the detected temperature.

As a system for adjusting the driving energy imparted to the recording means, a limitation may be provided to the voltage data in an ink jet recording apparatus of the type in which the driving voltage imparted to the ink jet head is varied to thereby control the amount of discharge. Also, in an ink jet recording apparatus of the type in which the amount of discharge is controlled by the driving pulse width, a similar effect may be obtained by providing a limitation to the pulse width data.

In the third embodiment, a plurality of limiters are provided so as to be suited for respective temperatures, whereby switching is effected by a temperature signal, but a similar effect may be obtained by providing a limiter having an element capable of setting and switching the limitation level, and switching only that element.

Figure 13:
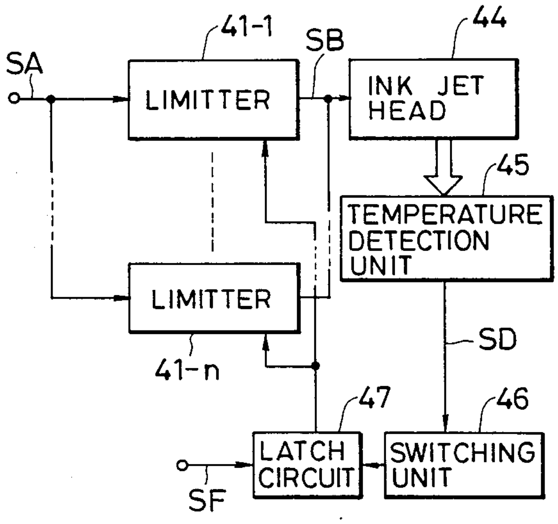
FIG. 13 is a block diagram showing a modification of the circuit shown in FIG. 10.

FIG. 13 shows an ink jet recording apparatus constructed by adding a latch circuit 47 to the apparatus shown in FIG. 10. In this apparatus, a temperature switching signal SE is held by a printing start signal SF only during the printing, and limiters 41-1 to 41-n can be prevented from being switched during the printing. That is, where for example, the number of switching stages is decreased, when switching takes place during the printing, density irregularity of recorded images may occur, but according to the present embodiment, this can be prevented.

According to the present invention, as described above, the head driving voltage value relative to the density data is selectively put out in conformity with temperature data and therefore, the driving voltage of the recording head becomes good under any temperature condition which may occur during the use of the apparatus, and also the driving frequency of the recording head is changed and thus, under any temperature condition which may occur during the use of the apparatus, the driving frequency and driving voltage of the recording head become optimum, whereby there can be provided an ink jet recording apparatus which can always accomplish recording of high quality and can completely absorb the irregularity of the characteristic resulting from the temperature of the recording head. This recording apparatus has an effect that the amount of ink discharge of the head is made proper under any temperature condition and recording by half-tone representation of high quality becomes possible. Also, the amount of ink discharge can be made proper by a simple circuit construction and therefore, as compared with the conventional apparatus using a heater or the like, power saving, lower cost, compactness and improved reliability of the ink jet recording apparatus can be obtained.

What is claimed is:

1. An ink jet recording apparatus comprising:

ink jet recording means for recording at a recording density determined by discharging an amount of ink corresponding to the magnitude of a driving signal supplied thereto;

detecting means for detecting ambient temperature and generating a signal in accordance with the detected temperature; and drive control means for accepting an input signal having a magnitude in accordance with a desired recording density and outputting a driving signal, said drive control means including a plurality of limiters for setting a stepwise plurality of driving signal ranges, wherein one of said limiters is selected in accordance with the signal from said detecting means so as to provide a driving signal range in which said ink jet recording means will perform stable discharge and said selected limiter accepts the input signal and supplies a driving signal to said ink jet recording means in accordance with the input signal when the input signal is within the driving signal range of said selected limiter and supplies a driving signal in the vicinity of a limit of the driving signal range of said selected limiter when the input signal is outside the driving signal range of said selected limiter.

2. An ink jet recording apparatus according to claim 1, further comprising switching means for selecting one of said plural limiters by generating a selection signal in response to said detecting means.

3. An ink jet recording apparatus according to claim 2, further comprising latch means for latching the selection signal, wherein said latch means inhibits switching of said limiters during recording by said ink jet recording means.

* * * * *

UNITED STATES PATENT AND TRADEMARK OFFICE
CERTIFICATE OF CORRECTION

PATENT NO. : 4,860,034

DATED : August 22, 1989

INVENTOR(S) : Yoshitaka Watanabe, et al.

It is certified that error appears in the above-identified patent and that said Letters Patent is hereby corrected as shown below:

Item [57]:

Line 7, "the since" should read --since--.

IN THE DRAWINGS

Fig. 2, insert --PRIOR ART--.
Fig. 3, "MOTOR DRIVE" should read --MOTOR DRIVER--.
Fig. 10, "LIMITTER" should read --LIMITER-- (all occurrences).
Fig. 13, "LIMITTER" should read --LIMITER-- (both occurrences).

COLUMN 1

Line 24, "the" (first occurrence) shoudl be deleted.
Line 52, "had" should read --head--.

COLUMN 2

Line 54, "the second con-" should read --an arrangement--.
Line 55, "struction" should be deleted.
Line 58, "obtaining" should read --for obtaining--.

UNITED STATES PATENT AND TRADEMARK OFFICE

CERTIFICATE OF CORRECTION

PATENT NO. : 4,860,034

DATED : August 22, 1989

INVENTOR(S) : Yoshitaka Watanabe, et al.

It is certified that error appears in the above-identified patent and that said Letters Patent is hereby corrected as shown below:

COLUMN 7

Line 31, "environment" should read --ambient--.
Line 36, "envi-" should read --ambient--.
Line 37, "ronment" should be deleted.
Line 47, "environment" should read --ambient--.

COLUMN 8

Line 1, "corresponding" should read --corresponding to--.

Signed and Sealed this

Twenty-eighth Day of August, 1990

Attest:

HARRY F. MANBECK, JR.

*Attesting Officer*

*Commissioner of Patents and Trademarks*